United States Patent
Matts et al.

(10) Patent No.: US 7,458,552 B2
(45) Date of Patent: *Dec. 2, 2008

(54) ADJUSTABLE LIGHT FIXTURE MOUNTING ASSEMBLY

(75) Inventors: Monte E. Matts, Clovis, CA (US); Jay P. Showalter, Clovis, CA (US)

(73) Assignee: Fresno Valves & Castings, Inc., Selma, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 11/469,154

(22) Filed: Aug. 31, 2006

(65) Prior Publication Data

US 2007/0258252 A1  Nov. 8, 2007

Related U.S. Application Data

(60) Continuation of application No. 11/041,349, filed on Jan. 24, 2005, now Pat. No. 7,108,405, which is a division of application No. 10/442,904, filed on May 21, 2003, now Pat. No. 6,966,679.

(51) Int. Cl.
*A47H 1/10* (2006.01)

(52) U.S. Cl. .................... 248/324; 362/404; 362/418; 362/427

(58) Field of Classification Search .......... 248/231.21, 248/324, 226.11; 362/427, 418, 404, 419, 362/449
See application file for complete search history.

(56) References Cited

U.S. PATENT DOCUMENTS

| 598,202 | A | * | 2/1898 | Harrel ........................ 74/551.4 |
| 1,564,270 | A | | 12/1925 | Phillips, Jr. |
| 1,712,865 | A | | 5/1929 | Allyn |
| 2,434,986 | A | | 1/1948 | Bremer |
| 2,458,967 | A | | 1/1949 | Wiedenhoeft |
| 2,825,586 | A | | 3/1958 | Robboy |
| 4,143,413 | A | | 3/1979 | Kelly |
| 4,188,142 | A | | 2/1980 | Olsson |
| 4,386,393 | A | | 5/1983 | Pike |
| 4,390,933 | A | | 6/1983 | Warshawsky |

(Continued)

OTHER PUBLICATIONS

B-K Lighting, Catalog pages for 360HD Mounting System.

(Continued)

*Primary Examiner*—Amy J. Sterling
(74) *Attorney, Agent, or Firm*—James F. Hann; Haynes Beffel & Wolfeld LLP

(57) ABSTRACT

The components of an adjustable light fixture mounting assembly are secured during adjustment of a light in a lighting system. A knuckle joint with a locking taper secures an upper knuckle half to a lower knuckle half. The locking taper secures the adjustment of the knuckle halves, even if the knuckle screw becomes loosened. In a further embodiment, an O-ring seal between a double locking taper seals the knuckle joint from moisture. A rotating locking clamp secures the lower knuckle half to a nipple with a reverse taper on both the lower knuckle half and the nipple, while allowing rotation of the lower knuckle half with respect to the nipple. Stop pins in the lower knuckle and nipple cooperate with an interior profile of the rotating locking clamp to allow 360 degrees rotation of the lower knuckle half with respect to the nipple.

3 Claims, 4 Drawing Sheets

U.S. PATENT DOCUMENTS

| | | | |
|---|---|---|---|
| 4,700,017 A | 10/1987 | Morand | |
| 4,836,485 A * | 6/1989 | Cooper | 248/278.1 |
| 5,278,735 A | 1/1994 | Her | |
| 5,290,074 A | 3/1994 | Chapman | |
| 5,379,205 A | 1/1995 | Peng | |
| 5,381,323 A | 1/1995 | Osteen et al. | |
| 5,504,665 A | 4/1996 | Osteen et al. | |
| 5,510,970 A | 4/1996 | Hollenbach et al. | |
| 5,535,109 A | 7/1996 | Moore et al. | |
| 5,593,224 A | 1/1997 | Kunkel et al. | |
| 5,599,091 A | 2/1997 | Kira | |
| 5,615,946 A | 4/1997 | Yeh | |
| 5,690,419 A | 11/1997 | Siems | |
| 5,713,662 A | 2/1998 | Kira | |
| 5,746,495 A | 5/1998 | Klamm | |
| 5,758,953 A | 6/1998 | Moore et al. | |
| 5,941,630 A | 8/1999 | Finke et al. | |
| D424,731 S | 5/2000 | Landefeld | |
| 6,059,429 A * | 5/2000 | Bodell | 362/287 |
| 6,161,948 A * | 12/2000 | Hagen | 362/418 |
| 6,254,258 B1 | 7/2001 | Case | |
| 6,527,466 B1 | 3/2003 | Blier et al. | |
| 6,902,200 B1 * | 6/2005 | Beadle | 285/185 |
| 7,108,405 B2 * | 9/2006 | Matts et al. | 362/418 |

OTHER PUBLICATIONS

Cooper Lighting, Catalog pages for Monaco 2004.
Kim Lighting, Catalog pages for Scrab 6725 (Aug. 1, 1999).
Kim Lighting, Display page (photograph of exploded assembly) for Scrab Accent Lighting.
Winona Lighting, Catalog page for Winscape Pine Series (Jul. 1, 2001).
Winscape, Catalog page for Pine Series, p. 20.

\* cited by examiner

ADJUSTABLE LIGHT FIXTURE MOUNTING ASSEMBLY

CROSS-REFERENCE TO RELATED APPLICATIONS

The present application is a Continuation of U.S. patent application Ser. No. 11/041,349, which is a Division of U.S. patent application Ser. No. 10/442,904, filed on May 21, 2003.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to devices for mounting a light in a lighting system, and more particularly to a light fixture mounting assembly that secures the components of the assembly after adjustment.

BACKGROUND OF THE INVENTION

Outdoor lighting systems use light fixtures that aim a lamp in a desired direction and are generally intended to keep moisture from the electrical wiring running through the light fixture. The lamp, such as a spot light or flood light, is aimed to illuminate a particular area. Light fixture mounting assemblies for such applications typically include adjustable connections that allow the user to aim the light when the light fixture is installed, and various seals to keep moisture out of the light fixture.

A knuckle joint between the lamp and a mounting member of the light fixture mounting assembly is often used to allow limited rotation of the lamp about the knuckle joint. Rotation in this plane is commonly referred to as "vertical" adjustment, although this designation is used only for convenient discussion, and does not necessarily represent rotation of the light in a vertical direction. One type of knuckle joint uses locking teeth or serrations on opposing faces of the knuckle joint halves. A screw through the axis of the knuckle joint holds the opposing locking teeth together once the light fixture has been aimed and the screw has been tightened. Unfortunately, the locking teeth provide only step-wise adjustment, and the screw must be loosened to provide sufficient clearance to rotate the teeth past each other when aiming the light fixture. The exact aiming of the light fixture is not apparent until the screw holding the knuckle joint halves together has been re-tightened. Precise aiming of a light fixture with a serrated knuckle joint can involve multiple iterations, and is often done using two persons.

Other types of light fixtures provide tapers on the mating halves of the knuckle joint. One type of light fixture provides a tapered post on one half of the knuckle joint that mates with a tapered hole in the other half of the knuckle joint. The locking screw is tightened to hold the tapered parts together. Loosening the locking screw allows the knuckle joint to smoothly rotate for aiming the light fixture. However, the tapered post has a relatively long taper at a typical taper angle of about 7-8 degrees. The long taper results in a thick knuckle joint, which is undesirable when using this type of knuckle joint with smaller light fixtures.

Another disadvantage of this design is that the wireway for the electrical wiring goes around the tapered post. Thus, the inner diameter of the wireway through the knuckle joint includes the tapered post. Rotating the knuckle can strain the wiring because the wiring wraps around the tapered post.

Another type of light fixture has a tapered structure between the faces of the knuckle halves outside (i.e. beyond the outer diameter) of the wireway. A ridge with a tapered face is formed on one knuckle half, and a groove with a tapered face is formed on the other knuckle half. The tapered face of the ridge mates with the tapered face of the groove. The tapered structure provides friction to hold the knuckle halves together when the locking screw is tight. This light fixture avoids straining the wiring around a thick central post when aiming the light fixture, but the tapered structure provides relatively little contact area. The fixture can come out of alignment if the locking screw is not sufficiently tight.

Unfortunately, if the locking screw of any of the above light fixtures loosens, the knuckle joint might rotate if even modest torque is applied, resulting in the light fixture coming out of alignment. The locking screw is particularly likely to loosen in applications where the light fixture is subject to vibration. For example, light fixtures near or on a ride at an amusement park, or adjacent to a cobblestone street, experience vibration that can loosen the locking screw. Similarly, some lamps are fairly heavy, and subjecting the light fixture to vibration might also provide sufficient torque on the loosened knuckle joint to cause the lamp to come out of alignment. Thus, it is desirable to provide a lighting fixture that more securely maintains its alignment, and is less susceptible to misalignment if the locking screw loosens.

In addition to allowing adjustment in the vertical direction, many light fixtures also allow rotational adjustment in the horizontal direction. "Horizontal" adjustment commonly refers to rotating the lamp about an axis that is orthogonal to the axis of the knuckle joint. Some light fixtures are horizontally adjusted by loosening a locking nut that holds the light mounting assembly to a mounting surface or outlet box, rotating the assembly, and tightening the locking nut. Access to the locking nut is typically behind the mounting surface or inside the outlet box, which makes horizontal adjustment difficult. This approach to horizontal adjustment is also trial-and-error, as the installer cannot view the aim of the light fixture until after the locking nut has been tightened and the light fixture is secured to the mounting surface or outlet box.

Another approach to horizontal adjustment uses a threaded stud that is secured to a mounting surface or outlet box. The stud is rotatably coupled to a base member of the light fixture. When the light fixture is horizontally rotated to the desired alignment, a set screw in the base member is tightened against the stud. However, the set screw has a limited contact area and tends to damage the finish, or even gouge, the surface of the stud. As with the locking screw of the knuckle joints, the set screw can loosen from a variety of causes, such as vibration. A slight loosening can allow the light fixture to come out of alignment. If the set screw is sufficiently loosened or removed, such as by a careless maintenance worker, the base member can fall away from the stud. Although the electrical wiring provides some attachment of the light fixture to its mounting surface, many light fixtures are quite heavy and the wiring might not hold the light fixture. Dropping the light fixture could damage the light fixture and cause injuries. Therefore, it is desirable to provide convenient, safe horizontal adjustment of light fixtures.

Horizontal adjustment techniques typically include some sort of device that limits rotating the light fixture to about one revolution with respect to the base. This is a safety requirement for many applications, and avoids undue strain on the wiring that might otherwise result from repeatedly wrapping or twisting the wiring. Some light fixtures include a stop member on the stud that interacts with a stop member on the base member to limit horizontal rotation to less than 360 degrees. However, there is a "dead spot" in the aiming pattern of the light fixture that occurs because of the thickness of at least one of the stop members. It is further desirable to provide horizontal adjustment through at least 360 degrees.

DETAILED DESCRIPTION OF THE INVENTION

I. Exemplary Light Fixture Mounting Assemblies

Figure 1A:
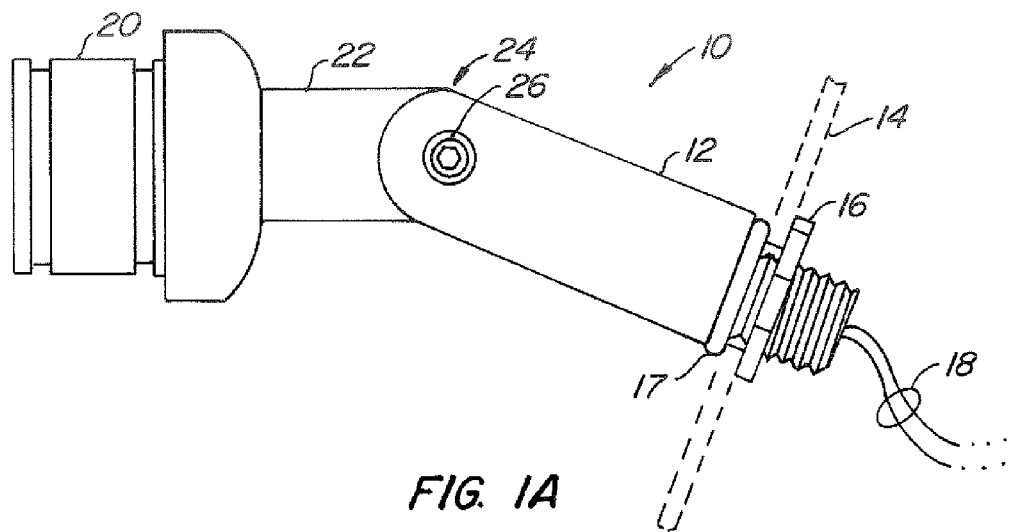
FIG. 1A is a simplified side view of a light fixture mounting assembly with a threaded lower member according to an embodiment of the present invention.

FIG. 1A is a side view of light fixture mounting assembly 10 with threaded lower member 12 according to an embodiment of the present invention. Threaded lower member 12 is attached to mounting surface 14 (shown as dashed lines) with locking nut 16. O-ring 17 forms a seal between lower member 12 and mounting surface 14. Mounting surface 14 could be the cover of an outlet box or a panel, for example.

Electrical wires 18 extend through wireways (not shown in FIG. 1A) in lamp fixture mounting assembly 10 to provide electrical power to a lamp (not shown) that can be attached to body 20 of upper member 22. Body 20 can be any of several shapes and configurations depending on the type of lamp that is intended to be used with light fixture mounting assembly 10.

Upper member 22 is rotatably attached to lower member 12 through knuckle joint 24. Knuckle joint 24 includes a self-locking taper structure (see FIGS. 1B, 1C, ref. nums. 28, 28') that secures upper member 22 to lower member 12 when locking screw 26 is tightened, and remains secured, even if locking screw 26 is loosened or removed, until the taper lock is broken. The taper lock is typically broken by tapping upper member 22 with a mallet, or by twisting upper member 22 out of the plane of lower member 12. In one embodiment, the taper angle of the self-locking taper structure is less than 7 degrees. In another embodiment, the taper angle is between about 6 degrees and about 3 degrees. In a particular embodiment, the taper angle is about 3 degrees.

Figure 1B:
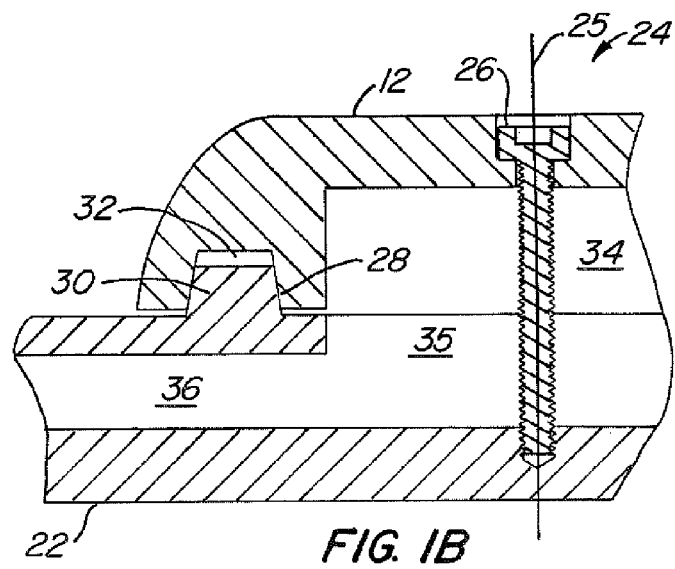
FIG. 1B is a simplified cross section of a knuckle joint with a self-locking double taper structure in accordance with an embodiment of the present invention.

FIG. 1B is a simplified cross section of a knuckle joint 24 with self-locking double taper structure 28 in accordance with an embodiment of the present invention. Self-locking double taper structure 28 includes a double-tapered ridge 30 on upper member 22 that corresponds to a double-tapered groove 32 in lower member 12. Ridge 30, see FIG. 1D, includes first and second radially spaced apart ridge surfaces 30A, 30B while groove 32 is bounded by first and second radially spaced apart groove surfaces 32A, 32B. It is generally desirable that the mating faces of self-locking double taper structure 28 be located as far from axis 25 as practical to optimize the locking force(s) obtained from self-locking double taper structure 28. In an alternative embodiment, a double-tapered groove is formed in the upper member and the double-tapered ridge is formed on the lower member. Each face of double-tapered ridge 30 is formed at a self-locking taper angle of between 3 degrees and 6 degrees (from axis 25 of knuckle joint 24), and each face is typically, but not necessarily, at the same angle. The angle shown is exaggerated for purposes of illustration.

When locking screw 26 is tightened, double-tapered ridge 30 is pressed into double-tapered groove 32 and upper member 22 is locked in position relative to lower member 12. Self-locking double taper structure 28 holds the angle of upper member 20 to lower member 12 even if locking screw 26 is loosened or removed. Alternatively, the self-locking taper structure may be a single-taper structure or a triple- or other multiple-taper structure.

However, a double taper structure provides more contact area between the taper faces than a single taper structure of similar height (measured along the axis of rotation of the knuckle joint) and taper angle. Having more contact area between the taper faces more securely holds the knuckle joint in the desired configuration after tightening the locking screw. In other words, a greater torque would have to be applied to knock the lamp out of alignment. A double taper structure is particularly desirable in a small light fixture (e.g. a light fixture having an outer diameter of lower member 12 of not more than one inch) because a single taper structure with sufficient height to provide the desired locking force might not fit within the available section without unduly constricting the wireway(s).

A wireway 34 in lower member 12 allows the electrical wiring (not shown) to pass around locking screw 26 and into wireway 36 in upper member 22. The electrical wiring does not have to wrap around self-locking double taper structure 28, but only the relatively thin locking screw 26, putting less strain on the electrical wiring when knuckle joint 24 is rotated. Having self-locking double taper structure 28 outside of wireway 35 of knuckle joint 24 also helps to exclude water from entering the wireways.

Figure 1C:
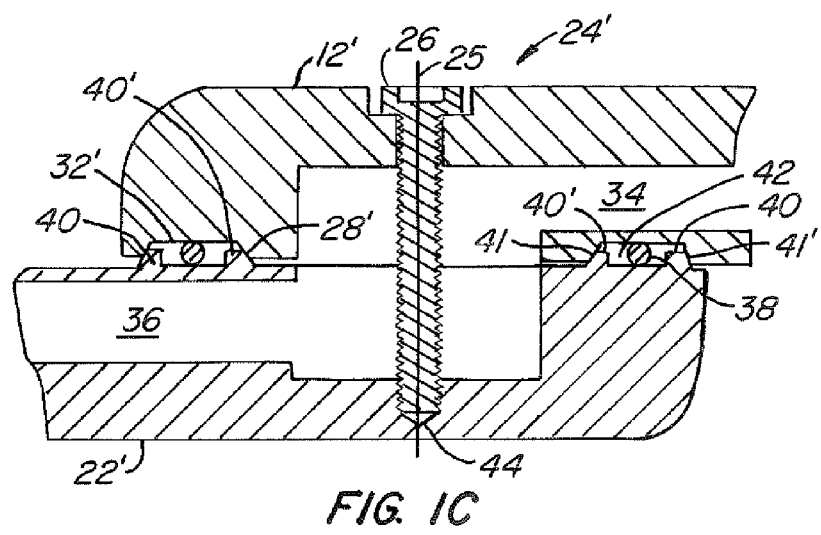
FIG. 1C is a simplified cross section of a knuckle joint with a self-locking taper structure and O-ring seal according to another embodiment of the invention.
Figure 1D:
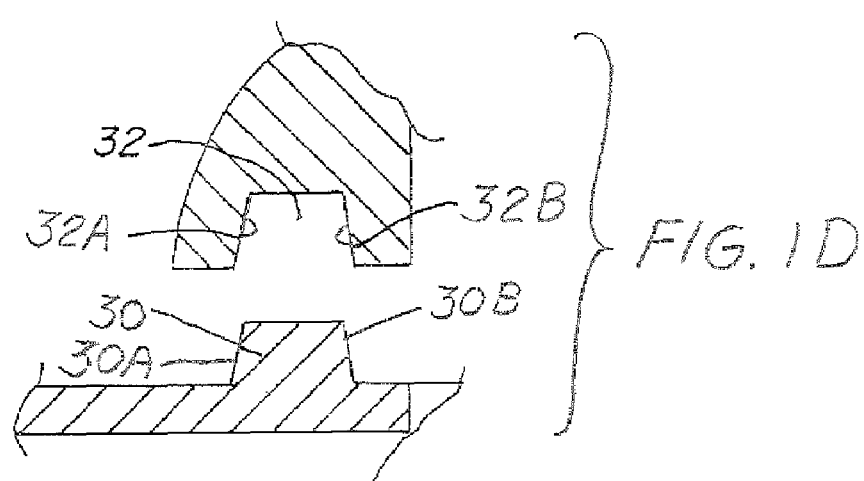
FIG. 1D illustrates a portion of FIG. 1B with the groove and ridge spaced apart to better illustrate the first and second groove and ridge surfaces.

FIG. 1C is a cross section of knuckle joint 24' with O-ring 38 according to another embodiment of the invention. O-ring 38 helps to further exclude water from entering the wireways 34, 36, particularly in conjunction with self-locking double taper structure 28'. Self-locking double taper structure 28' includes double-tapered groove 32' in lower member 12. Double-tapered ridge 40, 40' with taper faces 41, 41' on upper member 22 includes a slot 42 for O-ring 38 that seals against double-tapered groove 32' in lower member 12. Alternatively, double tapered ridge 40, 40' could be considered two concentric single-tapered ridges with an intervening O-ring slot, or the ridge(s) could be formed on the lower member, and the groove in the upper member.

Locking screw 26 is screwed into a blind hole 44. Providing a blind hole, rather than a through hole, prevents moisture from entering the end of locking screw 26. Locking screw 26 provides a clamping force against self-locking double taper structure 28' that secures knuckle joint 24' when locking screw 26 is tightened. However, unlike knuckle joints with non-locking tapers, knuckle joint 24' remains secure, i.e. will not easily rotate, even if locking screw 26 becomes loose, unless the taper lock is broken. When installing the light fixture mounting assembly, locking screw 26 is typically tightened just enough to allow rotating upper member 22 about knuckle joint 24' to aim the light while holding the position of upper member 22 during aiming. After the light fixture mounting assembly is adjusted to the desired aim point, locking screw 26 is further tightened to lock self-locking double taper structure 28'.

After self-locking double taper structure 28' is locked, knuckle joint 24' retains its alignment, even if locking screw 26 becomes loose. Similarly, when self-locking double tapered structure 28' is locked, knuckle joint 24' is not easily knocked or shaken out of alignment. Re-alignment of the light fixture mounting assembly is typically achieved by loosening locking screw 26 a few turns and tapping upper member 22 with a mallet to unlock self-locking double taper structure 28'. Alternatively, self-locking double taper structure 28' is unlocked by loosening locking screw 26 and twisting upper member 22 relative to lower member 12 in the plane of axis 25.

Figure 2A:
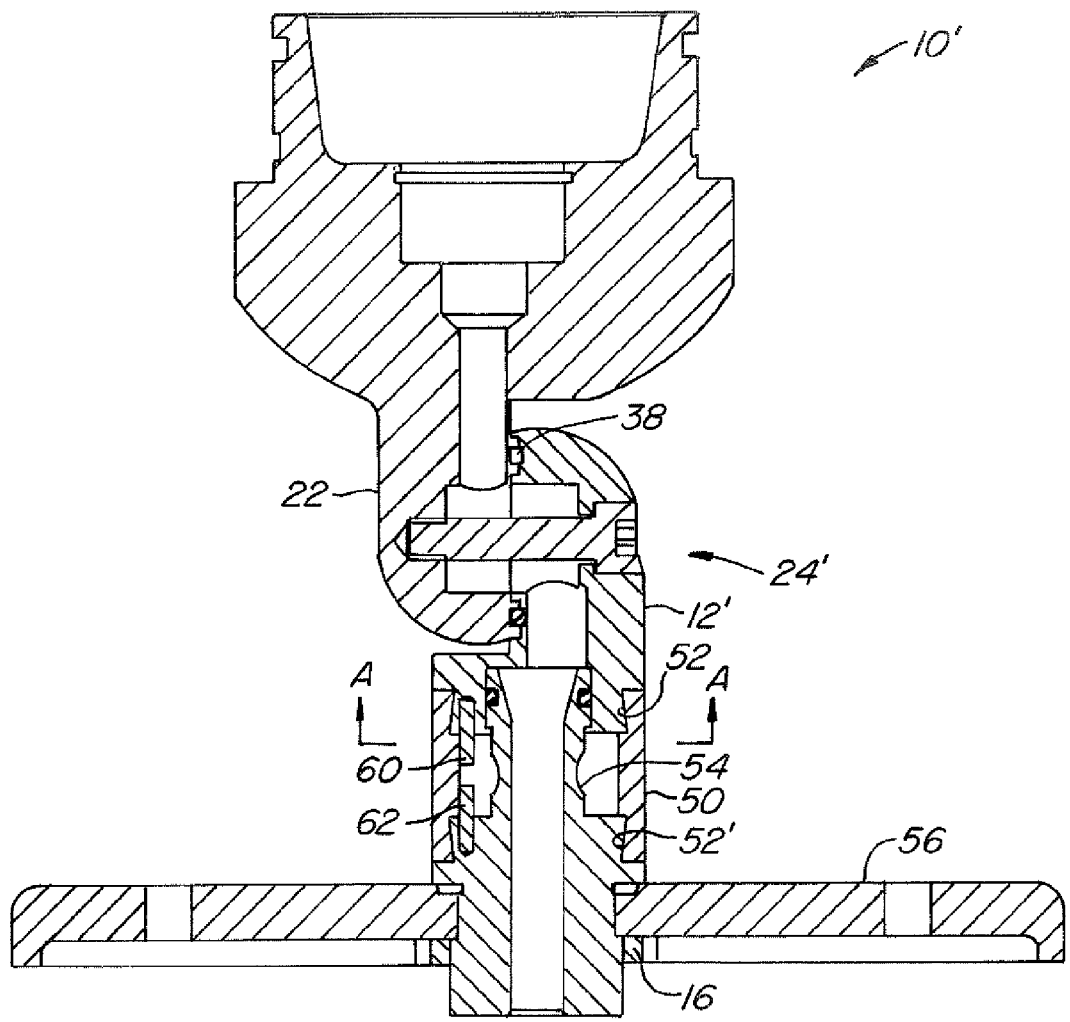
FIG. 2A is a simplified cross section of a light fixture mounting assembly with a clamp according to another embodiment of the present invention.
Figure 2B:
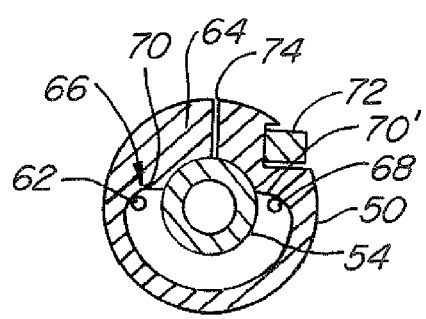
FIG. 2B is a cross section of the clamp taken through section line A-A in FIG. 2A showing the interior profile of the clamp.
Figure 2C:
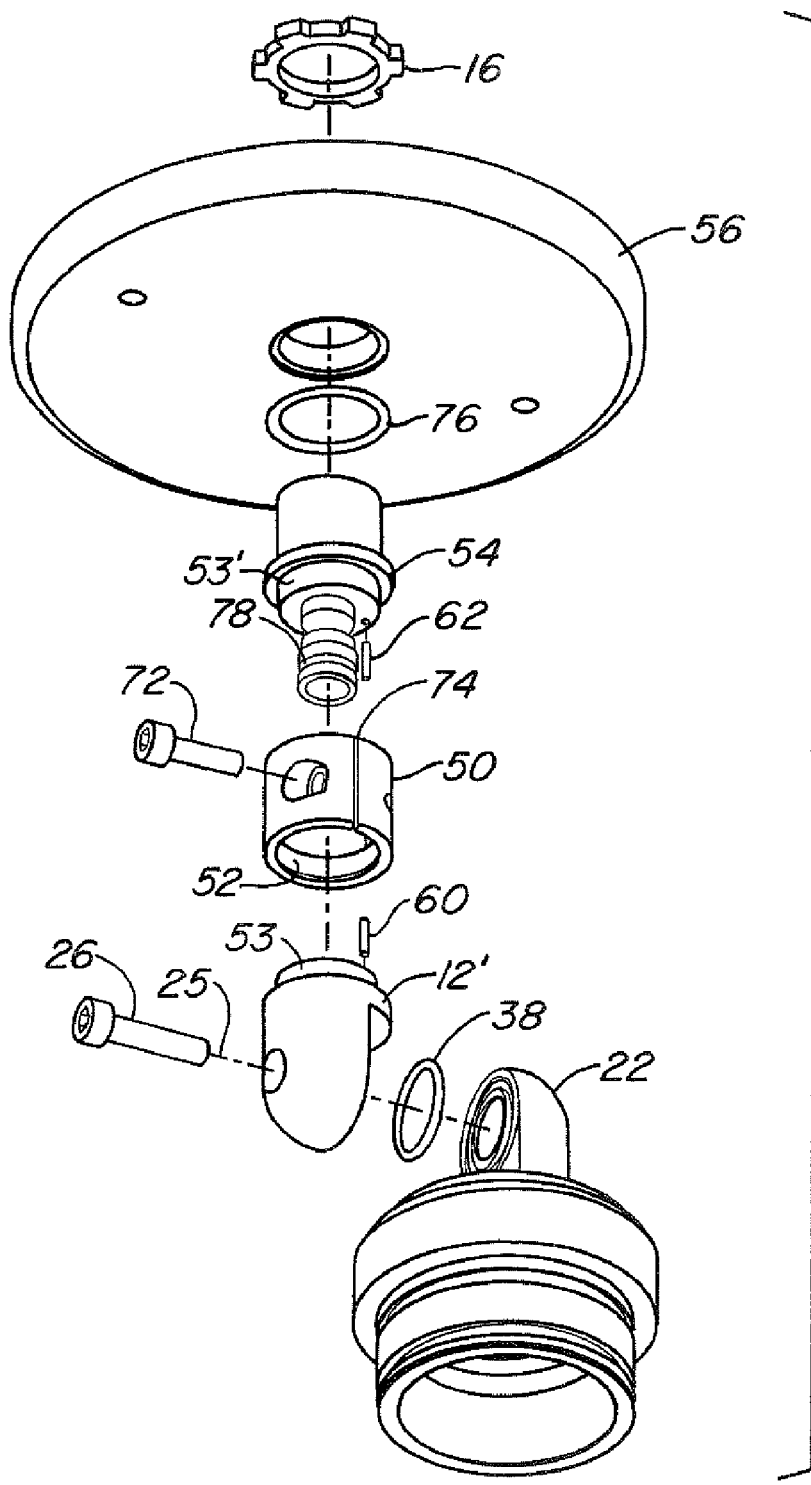
FIG. 2C is a perspective exploded view of the light fixture mounting assembly of FIG. 2A.

FIG. 2A is a simplified cross section of a light fixture mounting assembly 10' with a clamp 50 according to another embodiment of the present invention. Clamp 50 is generally barrel shaped and has reverse tapers 52, 52' on each end that correspond to reverse tapers on lower member 12' and nipple 54 (see FIG. 2C, ref. nums. 53, 53'). The reverse tapers have inner diameters proximate to the ends of clamp 50 that are less than the inner diameters distal from the ends of clamp 50 (see also FIG. 3). Clamp 50 allows lower member 12' to rotate relative to nipple 54 and has a binder screw (see FIGS. 2B and 2C showing binder screw 72 and slot 74) that can be tightened to secure the rotational relationship between nipple 54 and lower member 12'. The binder screw can be replaced by other securing elements, such as a C-clamp or a buckle. Reverse tapers 52, 52' hold nipple 54 and lower member 12' together, even if clamp 50 is loose or the binder screw is missing.

Light fixture mounting assemblies are made from a variety of materials, such as aluminum, stainless steel, brass, bronze, and fiber-reinforced polymer, by a variety of methods, such as machining or casting. For example, both aluminum and stainless steel have a "stickier" feel than brass or bronze when the knuckle joint is rotated under partial compression, but not locked. These materials generally provide a greater locking force than brass or bronze. However, brass or bronze has a "smoother" feel under partial compression than aluminum or stainless steel.

FIG. 2A also shows upper member 22 of light fixture mounting assembly 10' and O-ring 38 of knuckle joint 24'. Nipple 54 is secured to mounting plate 56 with nut 16. Rotation limit pins 60, 62 limit rotation of lower member 12' to 360 degrees with respect to nipple 54 in conjunction with an interior profile of clamp 50 (see FIG. 2B, ref. num. 64). Rotation limit pin 60 is pressed into lower member 12', and rotation limit pin 62 is pressed into nipple 54. In another embodiment, tabs, tangs or other rotation limiting structure are formed on lower member 12' and/or nipple 54 to operate in conjunction with the interior profile of clamp 50. In an alternative embodiment, interior profiles are formed in the nipple and in the lower member, and corresponding limit structures, such as limit pins or tangs, are provided in the clamp.

FIG. 2B is a cross section of clamp 50 taken through section line A-A in FIG. 2A showing interior profile 64 and rotation limit pin 62, which is pressed into nipple 54 (see FIG. 2A). Rotation limit pin 62 allows rotation of the nipple with respect to clamp 50 from first position 66 to second position 68 (shown in dashed lines). Rotation limit pin 62 contacts limit portions 70, 70' of interior profile 64 at first position 66 and second position 68, respectively. The limit portions 70, 70' are configured to account for the thickness of rotation limit pin 62 to allow a selected rotation of nipple 54 with respect to clamp 50. In this embodiment, nipple 54 rotates 180 degrees, and the rotation limit pin pressed into the lower member (see FIG. 2A, ref. nums. 60, 12') contacts interior profile 64 of clamp 50 in a similar fashion to allow the lower member to also rotate a 180 degrees with respect to clamp 50. Thus, the lower member can rotate over 360 degrees with respect to the nipple, eliminating "dead spots" when aiming the light fixture. In another embodiment, the lower member rotates 370, or more, degrees with respect to the nipple. Rotation may be limited to less than 360 degrees in alternative embodiments. It is not required that the nipple and lower member have the same rotation with respect to the clamp. For example, a thicker pin could be used in one half, and a thinner pin in the other, or the interior profile of the clamp could present different limit portions to each pin.

Binder screw 72 tightens clamp 50 about the nipple and lower member by closing slot 74, which runs longitudinally along clamp 50. Binder screw 72 is transverse to slot 74 and pulls slot 74 together when tightened. Clamp 50 is attached to the nipple and lower member by substantially loosening or removing binder screw 72 and spreading slot 74, such as with a screw driver, to allow the ends of clamp 50, which are reverse tapered, to slip over the corresponding reverse-tapered ends of the nipple and lower member.

FIG. 2C is a perspective exploded view of the light fixture mounting assembly 10' of FIG. 2A. Nipple 54 is secured to mounting plate 56 or similar mounting surface with nut 58. O-ring 76 seals nipple 54 against mounting plate 56. Another O-ring 78 seals the wireway in nipple 54 with lower member 12', while allowing rotation of nipple 54 with respect to lower member 12'. Pin 62 is pressed into nipple 54 and operates in conjunction with an interior profile (see FIG. 2B, ref. num. 64) of clamp 50 to limit rotation of nipple 54 with respect to clamp 50. Pin 60 is pressed into lower member 12' and also operates in conjunction with the interior profile of the clamp to limit rotation of lower member 12' with respect to clamp 50.

A reverse taper 53' is formed on nipple 54 to mate with the corresponding reverse taper (see FIG. 2A, ref. num. 52') in clamp 50. Similarly, a reverse taper 53 is formed on the end of lower member 12' to mate with corresponding reverse taper 52 in clamp 50. A tool, such as a screwdriver, is used to spread slot 74 open to allow insertion of the reverse taper 53' of nipple 54 and the reverse taper 53 of lower member 12' into the opposite ends of clamp 50. In a particular embodiment, the reverse tapers 52, 52' on each end of the clamp are the same, i.e. either end of the clamp will mate with either the nipple 54 or with the lower member 12'. When the tool is removed from slot 74 clamp 50 retains nipple 54 and lower member 12' (and associated parts, such as upper member 22 and any light attached to upper member 22), even if binder screw 72 is loose or missing. This is not only convenient when installing the light fixture mounting assembly, but also an important safety feature that prevents potentially heavy parts of the light fixture from in advertently falling. Lower member 12' can be rotated at least 360 degrees with respect to nipple 54 for aligning the light fixture, and secured by tightening binder screw 72, which provides a circumferential clamping force about the reverse tapers, drawing the nipple and lower member together with the reverse tapers and securing the alignment of the lower member with respect to the nipple without substantially marring the finish or surface of the lower member, nipple, or clamp. The circumferential clamping also provides greater securing force than typically achieved with a simple set-screw, and slight elastic deformation of the clamp when the binder screw is tightened provides tension on the binder screw to resist loosening, such as from vibration.

Figure 3:
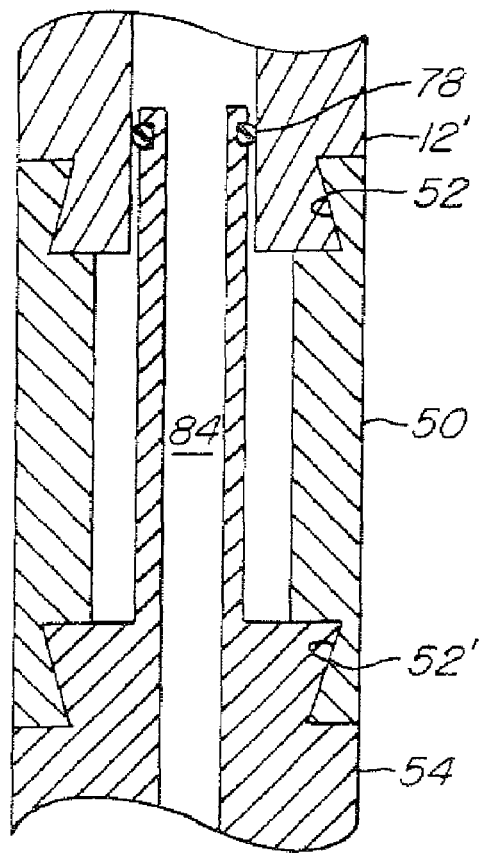
FIG. 3 is a cross section of a portion of the light fixture mounting assembly of FIG. 2A illustrating reverse tapers.

FIG. 3 is a simplified cross section of clamp 50 and associated components illustrating reverse tapers, which are exaggerated for purposes of illustration. Lower member 12' is coupled to clamp 50 with reverse taper 52 and nipple 54 is coupled to clamp 50 with reverse taper 52'. Wireway 84 extends through nipple 54, which is sealed to lower member 12' with O-ring 78.

Modification and variation can be made to be disclosed embodiments without departing from the subject of the invention as described herein. Any and all patents, patent applications and printed publications referred to above are incorporated by reference.

The invention claimed is:

1. A light fixture mounting assembly comprising:
   a first member;
   a second member rotatably coupled to the first member;
   a nipple;
   a chosen one of the nipple and the second member configured to be attached to a mounting surface;
   the nipple having an outer, circumferentially extending nipple mounting surface;
   the second member having an outer, circumferentially extending second member mounting surface;
   a clamp having first and second inner, circumferentially extending clamp mounting surfaces rotatably engaging the nipple and second member mounting surfaces; and
   the clamp being circumferentially tightenable onto the nipple and the second member to rotationally secure the second member with respect to the nipple.

2. A light fixture mounting assembly comprising:
   a first member;
   a second member rotatably coupled to the first member;
   a nipple;
   a chosen one of the nipple and the second member configured to be attached to a mounting surface;
   the nipple having an outer, circumferentially extending nipple mounting surface;
   the second member having an outer, circumferentially extending second member mounting surface;
   a clamp having first and second inner, circumferentially extending clamp mounting surfaces rotatably engaging the nipple and second member mounting surfaces;
   the clamp being rotatably coupled to the nipple with a first reverse taper and rotatably coupled to the second member with a second reverse taper; and
   means for circumferentially tightening the clamp onto the nipple and the second member to rotationally secure the second member with respect to the nipple.

3. The light fixture mounting assembly according to claim 1 wherein:
   the first and second inner, circularly extending clamp mounting surfaces rotatably engage the nipple and second member mounting surfaces with first and second reverse tapers, respectively; and
   the first and second reverse tapers bias the nipple and second member towards one another.

\* \* \* \* \*